(12) United States Patent
Schroeder et al.

(10) Patent No.: US 11,047,293 B1
(45) Date of Patent: Jun. 29, 2021

(54) ENGINE OPERATING METHOD AND PISTON HAVING NON-REENTRANT COMBUSTION BOWL AND ANTI-SOOTING RAMP

(71) Applicant: Caterpillar Inc., Peoria, IL (US)

(72) Inventors: Eric Lee Schroeder, Germantown Hills, IL (US); Jonathan Kevin Tooker, Whitestown, IN (US); Adam Joseph Clute, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/034,143

(22) Filed: Sep. 28, 2020

(51) Int. Cl.
*F02B 23/06* (2006.01)
*F02F 3/00* (2006.01)

(52) U.S. Cl.
CPC ...... *F02B 23/0621* (2013.01); *F02B 23/0624* (2013.01); *F02B 23/0651* (2013.01); *F02B 23/0672* (2013.01); *F02F 3/0015* (2013.01); *F02B 2201/02* (2013.01); *F02B 2275/40* (2013.01)

(58) Field of Classification Search
CPC .............. F02B 23/0621; F02B 23/0672; F02B 23/0651; F02B 23/0624; F02B 2275/40; F02B 2201/02; F02F 3/0015
See application file for complete search history.

(56) References Cited

U.S. PATENT DOCUMENTS

| | | |
|---|---|---|
| 6,314,933 B1 | 11/2001 | Komatsu |
| 7,040,279 B2 | 5/2006 | Regueiro |
| 7,210,448 B2 * | 5/2007 | Stanton ............... F02B 23/0672 123/298 |
| 8,156,927 B2 | 4/2012 | Hino |
| 8,677,970 B2 | 3/2014 | Cummins |
| 8,869,770 B2 | 10/2014 | Bazyn et al. |
| 9,238,996 B2 | 1/2016 | Easley et al. |
| 9,328,693 B2 | 5/2016 | Pierpont et al. |
| 9,885,277 B2 * | 2/2018 | Martinez ............ F02M 61/1813 |
| 10,041,395 B2 | 8/2018 | Shimo et al. |
| 10,113,503 B2 * | 10/2018 | Bowditch ........... F02B 23/0693 |
| 10,184,388 B1 * | 1/2019 | Ahmad ............... F02B 23/0696 |
| 10,634,089 B2 * | 4/2020 | Diwakar ................. F02F 3/027 |
| 2015/0128899 A1 * | 5/2015 | Easley ............... F02B 23/0693 123/294 |

(Continued)

OTHER PUBLICATIONS

Eric L. Schroeder, Specification and Drawings for U.S. Appl. No. 16/839,423 Piston Geometry for Reduced Smoke and Cylinder Head Component Temperatures filed Apr. 3, 2020.

*Primary Examiner* — Joseph J Dallo
*Assistant Examiner* — Kurt Philip Liethen
(74) *Attorney, Agent, or Firm* — Brannon Sowers & Cracraft (57) ABSTRACT

Operating an internal combustion engine includes conveying fuel of spray plumes of directly injected fuel out of a swirl pocket in a combustion bowl in a piston, and impinging the fuel upon an anti-sooting ramp transitioning between a radially inner shelf surface of the combustion bowl and a radially outer squish surface of the piston. The shelf surface is spaced an axial distance (FA) from a plane defined by the squish surface that is from 1% to 2% of an outer diameter (OD) dimension of the piston. Impinging the fuel upon the anti-sooting ramp directs the fuel upwardly from the squish surface to limit wall-wetting in the combustion cylinder.

19 Claims, 6 Drawing Sheets

(56) References Cited

U.S. PATENT DOCUMENTS

2015/0337757 A1* 11/2015 Page .................. F02B 23/0672
                                                              123/193.6
2016/0169152 A1    6/2016 Burger et al.
2017/0159549 A1* 6/2017 Uehara ............... F02B 23/0672

* cited by examiner

ENGINE OPERATING METHOD AND PISTON HAVING NON-REENTRANT COMBUSTION BOWL AND ANTI-SOOTING RAMP

TECHNICAL FIELD

The present disclosure relates generally to engine operating methodology and piston geometry for reduced production or smoke or soot, and more particularly to a piston having an anti-sooting ramp for redirecting injected fuel exiting a combustion bowl to limit wall-wetting.

BACKGROUND

Internal combustion engines are routinely used in various industries to power machines and equipment. Examples of industries using such machines and equipment include marine, earth moving, construction, mining, locomotive and agriculture industries, to name a few examples. Internal combustion engines with an increased power density are increasingly needed in various applications. Such engines are sometimes challenged by both high soot and high valve temperatures or other high cylinder head component temperatures that are developed at the rated condition for the engine. Strategies that enable improvements in one performance parameter, such as reduced soot production, often see negative or unpredictable impacts in other performance parameters such as production of oxides of nitrogen or "NOx" requiring engineers to balance sometimes competing considerations.

Research and development has progressed for decades in relation to the manner in which factors such a fueling, exhaust gas recirculation or EGR, turbocharging, variable valve actuation, variable geometry turbines, use of waste gates, and a host of others can be varied to produce different results. In addition to varying these and other operating parameters, a great deal of research and performance testing effort has centered around different ways that engine components, notably pistons in recent years, can be shaped and proportioned to achieve a range of desired outcomes. As suggested above, one motivation driving advancements in combustion science has been the desire to reduce and/or balance relative amounts of certain emissions in engine exhaust. Improving or optimizing engine fuel efficiency, and managing component wear and/or fatigue remain important goals as well. Increased demands for power density have heightened some of these challenges and the unpredictability in secondary effects from efforts to manipulate any one performance parameter. For such reasons, designs and strategies purpose-built for one application may reveal themselves to be less well-suited to others.

United States Patent Application Publication No. 2016/0169152 to Burger et al. proposes a piston having a top land surface having a height dimension. The piston has a nominal outer diameter, such that a specified ratio is achieved between the height and the inner diameter of the engine bore, apparently for purposes of improving engine operation by increasing power output, decreasing fuel consumption and decreasing emissions.

SUMMARY OF THE INVENTION

In one aspect, a method of operating an internal combustion engine includes reciprocating a piston defining a piston outer diameter (OD) dimension, in a combustion cylinder in the engine. The method further includes directly injecting a liquid fuel from a plurality of spray orifices in a fuel injector defining a longitudinal axis into the combustion cylinder in the engine, and advancing spray plumes of the injected liquid fuel outwardly and downwardly from the plurality of spray orifices through a combustion bowl of the piston having a non-reentrant profile. The method further includes conveying fuel of the spray plumes out of a swirl pocket of a combustion bowl into a shelf volume of a combustion bowl formed between a plane defined by a radially outer squish surface, and a radially inner shelf surface spaced an axial (FA) distance from the plane that is from 1% to 2% of the OD dimension. The method further includes impinging fuel of the spray plumes exiting the shelf volume of the combustion bowl upon an anti-sooting ramp transitioning between the radially inner shelf surface and the radially outer squish surface. The method still further includes directing the fuel of the spray plumes exiting the shelf volume upwardly from the squish surface based on the impingement of the fuel upon the anti-sooting ramp so as to limit wall-wetting in the combustion cylinder.

In another aspect, a piston configured to reciprocate in a combustion cylinder in an internal combustion engine includes an annular body including a crown portion defining a longitudinal axis and having a radially outer lip portion defining a plane oriented normal to the longitudinal axis. The crown portion further includes a combustion bowl having a radially inner shelf portion spaced a first axial (FA) distance from the plane, and a bottom surface spaced a second axial (SA) distance from the plane. The piston further includes an outer surface defining a piston outer diameter (OD) dimension, and a ratio of the FA distance to the OD dimension is from 1% to 2%, and a ratio of the FA distance to the SA distance is from 7% to 11%. The combustion bowl forms a non-reentrant profile, and the crown portion further includes an anti-sooting ramp transitioning between the radially inner shelf portion and the radially outer lip portion to redirect a flow of injected fuel exiting the combustion bowl upwardly from the radially outer lip portion, such that wall-wetting in the combustion cylinder is limited.

In still another aspect, a piston for an internal combustion engine includes an annular crown body defining a longitudinal axis and having a radially outer lip portion defining a plane oriented normal to the longitudinal axis. The annular crown body further includes a combustion bowl having a radially inner shelf portion spaced a first axial (FA) distance from the plane, a bottom concave surface spaced a second axial (SA) distance from the plane, and an outer bowl surface defining a tangent forming an acute included angle with the plane opening in a radially inward direction. The piston further includes a piston skirt attached to the annular crown body and defining a piston outer diameter (OD) dimension that is from 169 millimeters to 170 millimeters, and the FA distance is from 1.9 millimeters to 2.5 millimeters. The radially outer lip portion includes a planar squish surface and the radially inner shelf portion includes a planar shelf surface, and an anti-sooting ramp transitions between the planar shelf surface and the planar squish surface and has a concave curvilinear profile.

DETAILED DESCRIPTION

Various embodiments of a piston that may be used in an internal combustion engine, and a crown portion or piston crown with a piston bowl geometry according to various embodiments of the present disclosure are disclosed herein. As will be further apparent in view of the following description, pistons according to the present disclosure are expected to provide increased power density, reduced smoke or soot emissions, and reduced cylinder head component temperatures when an associated internal combustion engine is operated at its rated load.

Figure 1:
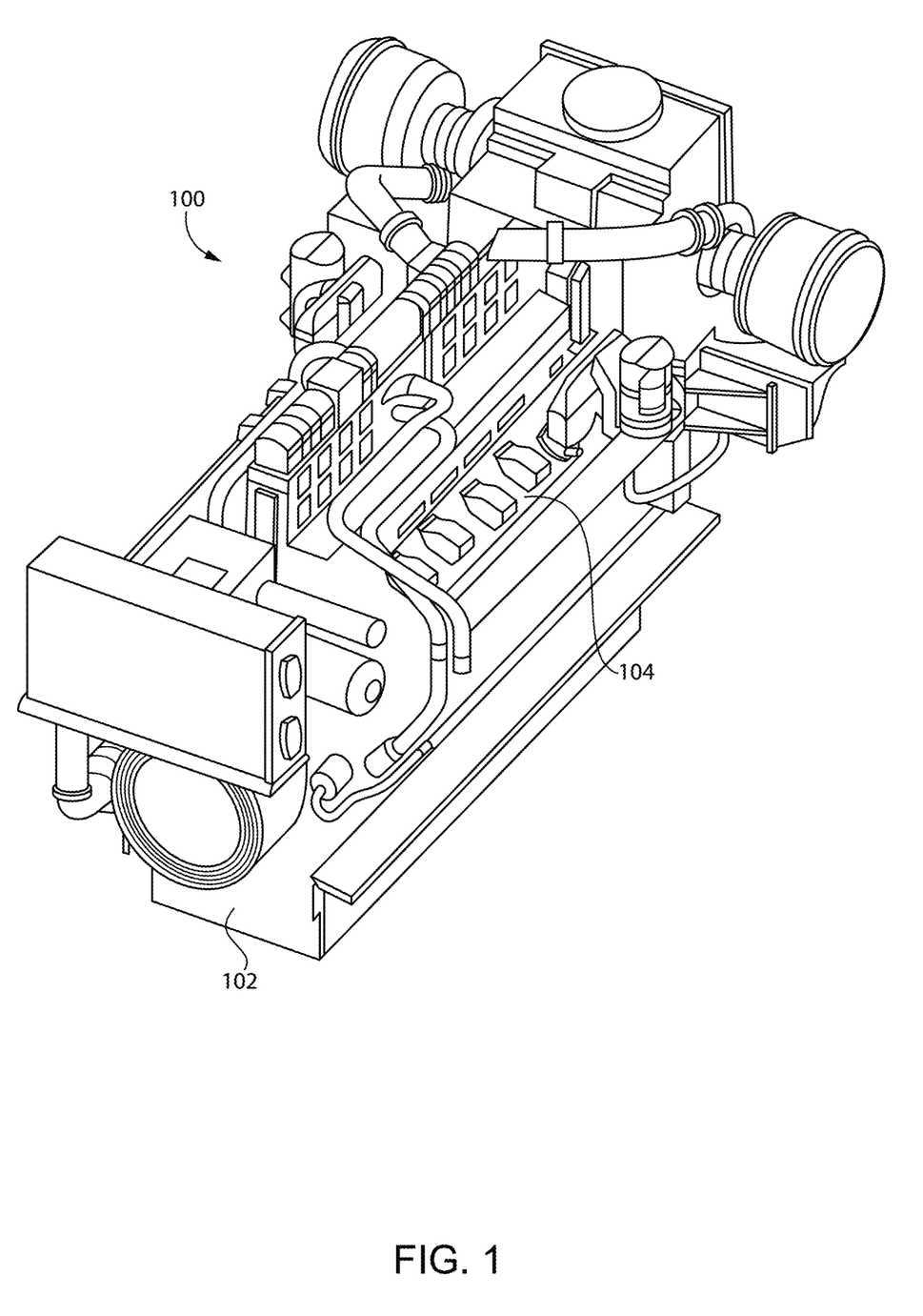
FIG. 1 is a perspective view of an internal combustion engine according to one embodiment.

Referring now to FIG. 1, there is shown an internal combustion engine 100 that may employ various embodiments of operating methodology and piston geometry according to the principles set forth herein. Engine 100 may include an engine block 102 in which the piston (not shown in FIG. 1) reciprocates, and a cylinder head 104 that may contain various engine components for the introduction of fluids into the bore/combustion cylinder located in engine block 102. Engine 100 could include any number of combustion cylinders and pistons, in any suitable arrangement such as a V-pattern or an inline pattern.

Figure 2:
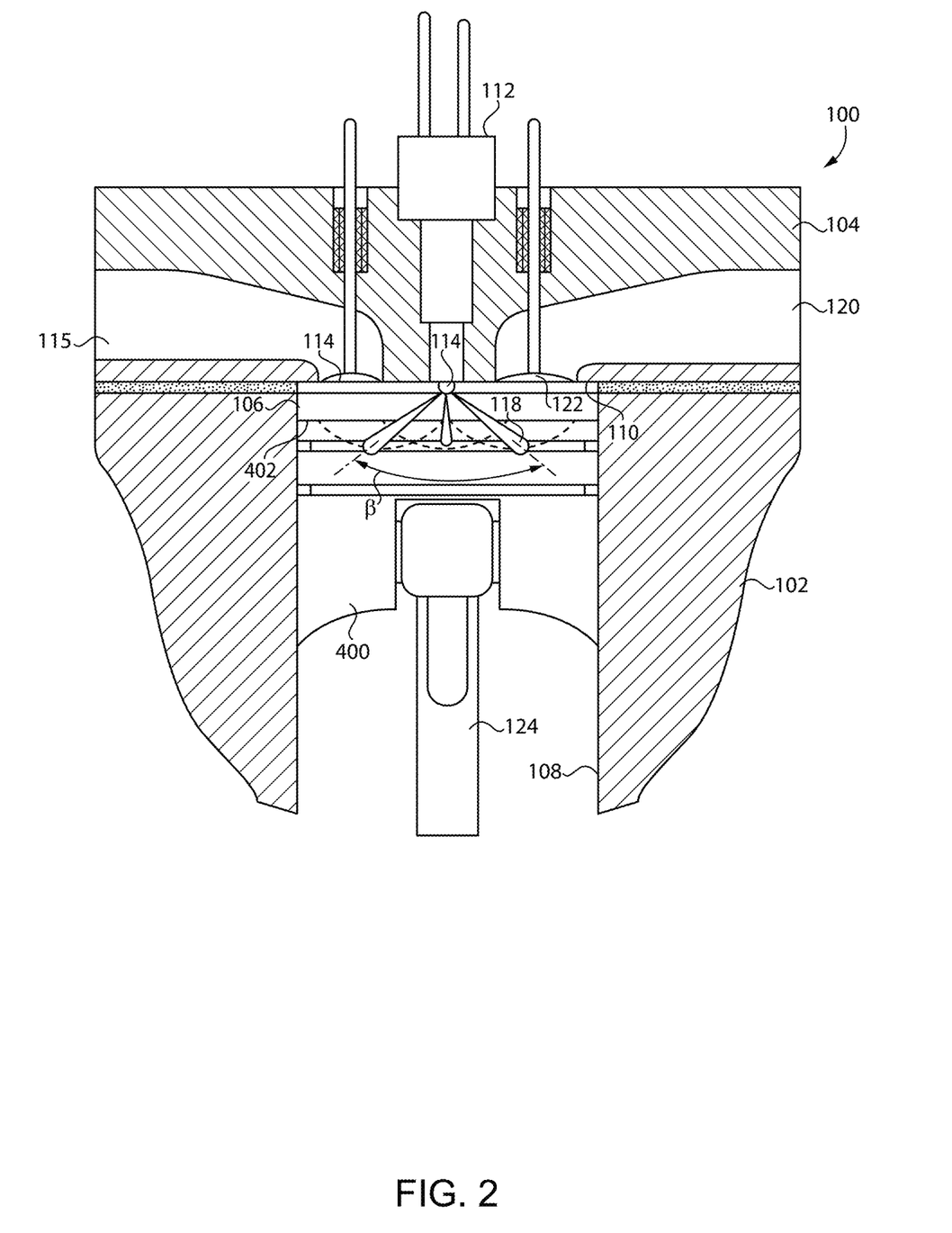
FIG. 2 is a sectioned side view of the internal combustion engine of FIG. 1, showing a piston according to one embodiment.

Referring also to FIG. 2, a portion of engine 100 is shown sectioned, including a combustion chamber or cylinder 106 that may have a generally cylindrical shape defined within a cylinder bore 108 formed within the crankcase or engine block 102 of engine 100. Combustion cylinder 106 is further defined at one end by a flame deck surface 110 of cylinder head 104, and at another end by a crown portion or piston crown 402 of a piston 400 that is configured to reciprocate within bore 108, and connected to a connecting rod 124 coupled to a crankshaft (not shown). A fuel injector 112 is mounted in cylinder head 104. Injector 112 has a tip 114 that protrudes within combustion cylinder 106 through flame deck surface 110 such that it can directly inject fuel into combustion cylinder 106. Engine 100 may be a compression-ignition engine such that piston 400 reciprocates to compress a mixture containing directly injected liquid fuel, such as a diesel distillate fuel, to an auto-ignition threshold, in a conventional four-stroke pattern.

During operation of engine 100 air, and potentially air and other intake gases such as recirculated exhaust gas, is admitted into combustion cylinder 106 via an air inlet passage 115 when one or more intake valves 117 (one shown) are open during an intake stroke. In a known configuration, high pressure fuel, such as a diesel distillate fuel, is permitted to flow through nozzle openings/ports in tip 114 to form fuel jets or fuel spray plumes that enter combustion cylinder 106. Each nozzle opening creates a fuel spray plume 118 that generally disperses to create a predetermined fuel/air mixture, which in a compression ignition engine auto-ignites and combusts. Fuel spray plumes 118 may be provided from injector 112 at an included angle β of between 110 and 150° for example, but other angles may also be used. Following combustion, exhaust gas is expelled from combustion cylinder 106 through an exhaust conduit 120 when one or more exhaust valves 122 are open during an exhaust stroke.

Figure 3:
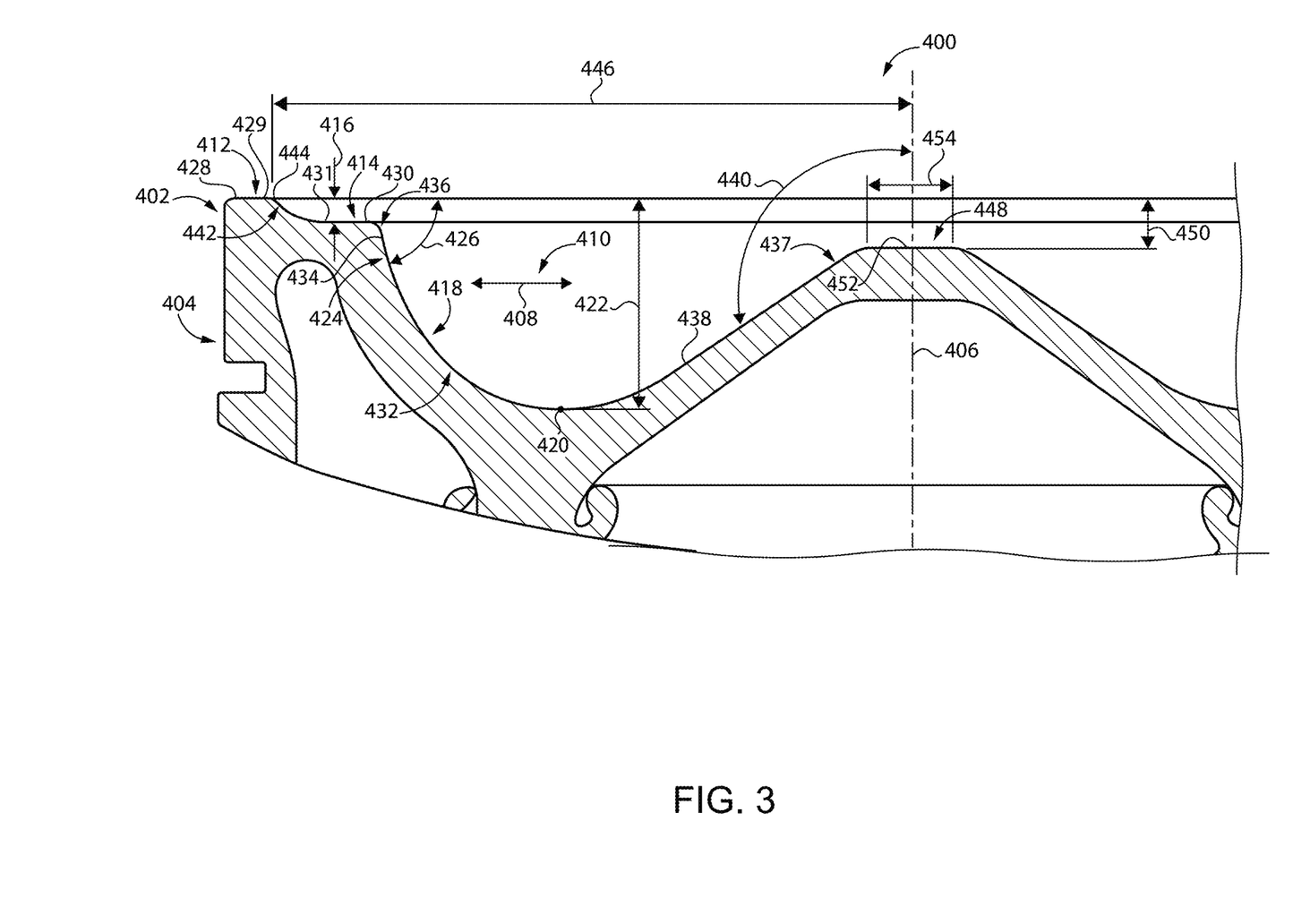
FIG. 3 is an enlarged sectioned side view of the piston of FIG. 2.

Referring now to FIG. 3, there is shown piston 400 illustrating further details. Piston 400 may be fabricated from steel, cast aluminum alloy, forged aluminum alloy or other suitable material that is durable and corrosion resistant. The geometry of the crown portion may be formed during the casting or forging process and then may be rough machined and/or finish machined if necessary. Suitable machining processes may include milling, turning, electrical discharge machining, or still others.

Piston 400 may include an annular body 404 including crown portion 402 and defining a longitudinal axis 406, a radial direction 408 perpendicular to longitudinal axis 406, and a plane (e.g. the sectioned plane shown in FIG. 3) containing longitudinal axis 406 and radial direction 408. Crown portion 402 may also include a contoured combustion bowl 410. Crown portion 402 also includes a radially outer lip portion 412, and contoured combustion bowl 410 includes a radially inner shelf portion 414 that is spaced axially away from radially outer lip portion 412, and a plane defined thereby as further discussed herein, a first axial (FA) distance 416.

A swirl pocket 418 extends radially inward (e.g. directly or indirectly) from radially inner shelf portion 414, and defines a lower axial extremity 420 that is spaced axially away from radially outer lip portion 412 and the plane defined thereby a second axial (SA) distance 422 that is greater than FA distance 416. Combustion bowl 410 has a non-reentrant profile, and swirl pocket 418 may define a tangent 424 extending in the radially outward direction and that forms an acute angle 426 with radially outer lip portion 412 ranging from 70 to 80° (e.g. 75.0°) in the plane containing the longitudinal axis 406 and the radial direction 408. Angle 426 may be defined by an outer bowl surface 434 and opens in a radially inward direction. A peak 448 may extend (e.g. tangentially) from surface 438. The peak 448 may be centered at longitudinal axis 406, and may be spaced axially away from squish surface 429 an axial offset distance 450 that is projected onto the plane containing longitudinal axis 406 and radial direction 408 ranging from 3.5 millimeters to 6 millimeters (e.g. 5.5 millimeters).

Figure 4:
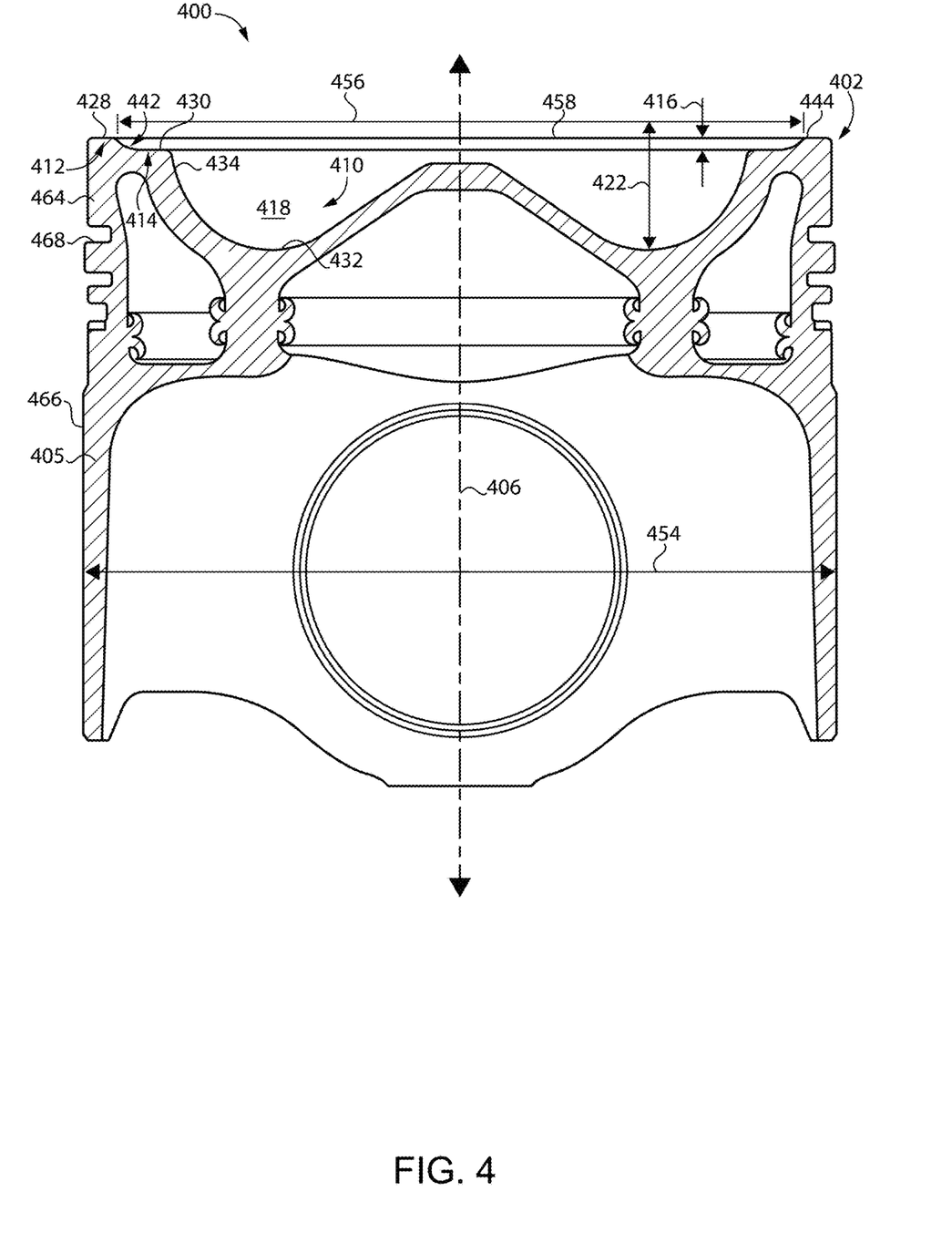
FIG. 4 is another sectioned side view of a piston as in FIG. 3.

Crown portion 402 may be defined solely by revolving the geometry of radially outer lip portion 412, and contoured combustion bowl 410 in the plane containing longitudinal axis 406 and radial direction 408 about longitudinal axis 406 by 360°. As a result, the cross-section geometry of crown portion 402 is the same in any plane containing longitudinal axis 406 and radial direction 408. With reference also to FIG. 4, it can be seen that radially outer lip portion 412 includes a planar squish surface 428 (e.g. may be perpendicular to longitudinal axis 406, and so called since this surface squishes or squeezes the fluid in the bore as piston 400 approaches the cylinder head), and radially inner shelf portion 414 may include a planar shelf surface 430 (e.g. may be parallel to the planar squish surface) that is spaced axially away from planar squish surface 428 FA distance 416. Squish surface 428 defines a plane 458 as noted above, and a shelf volume is defined in an axial direction between plane 458 and shelf surface 430.

Swirl pocket 418 may include a bottom concave arcuate surface or bowl bottom surface 432 defining lower axial extremity 420 of swirl pocket 418 that is spaced axially away from planar squish surface 428 and plane 458 SA distance 422. As used herein, "arcuate" includes any shape that is not straight or flat including a radius, an ellipse, a polynomial, a spline, etc. Swirl pocket 418 may further include outer surface 434 that extends radially and axially (e.g. directly or indirectly) from planar shelf surface 430, defining tangent 424 that forms acute angle 426 with plane 458, angle 426 opening in a radially inward direction.

A first transitional blend 436 connects outer surface 434 to shelf surface 430. First transitional blend 436 may define a radius of curvature that ranges from 1 millimeter to 10 millimeters, e.g. 2 millimeters. As used herein, the term "blend" may include any suitable geometry including a radius or other arcuate curve segment(s). Swirl pocket 418 may also include a second surface 438 that is conical and extends from bottom surface 432 toward longitudinal axis 406, forming an outside obtuse angle 440 with longitudinal axis 438 ranging from 110° to 130° projected onto the plane containing longitudinal axis 438 and radial direction 408. Angle 440 may be approximately 124.0° (+/_10.0°).

Piston 400 and combustion bowl 410 may further include an anti-sooting ramp 442 extending tangentially from shelf surface 430 axially upwardly toward squish surface 428. Anti-sooting ramp 442 transitions between shelf surface 430 and squish surface 429 and may define a concave ramp radius of curvature ranging from 5 millimeters to 10 millimeters in the plane containing longitudinal axis 406 and radial direction 408 (e.g. 7 millimeters). Anti-sooting ramp 442 connects to squish surface 428 at a cusp 444 (i.e. no tangency). Anti-sooting ramp 442 redirects a flow of injected fuel exiting combustion bowl 418 upwardly from radially outer lip portion 412, such that wall-wetting in an associated combustion cylinder is limited, as further discussed herein.

Referring also now to FIG. 4, crown portion 402 may include an annular crown body, and as shown in FIG. 4 crown portion 402 includes combustion bowl 410, and radially inner shelf portion 414 is part of combustion bowl 418. A piston skirt 405 is attached to crown portion 402, and includes a piston outer surface 466. Shelf portion 414 includes shelf surface 430 and extends circumferentially around longitudinal axis 406. Crown portion 402 also includes radially outer lip portion 412 that includes squish surface 428 and extends circumferentially around longitudinal axis 406. Radially outer lip portion 412, more particularly squish surface 428, defines plane 458 which is oriented normal to longitudinal axis 406 and generally located at an axially uppermost end of crown portion 402 and piston 400 itself.

Crown portion 402 also includes a top land 464, one or more additional lands (not numbered), and a top ring groove 468 structured to receive a piston ring and formed between top land 464 and a second one of the additional lands. Piston 400 defines an outer diameter (OD) dimension 454, which may be a widest point of piston 400. In an embodiment, outer surface 466 upon piston skirt 405 defines OD dimension 454. OD Dimension 454 may be located in/defined by piston skirt 405 as described, although the present disclosure is not thereby limited. OD dimension 454 may be from 169 millimeters to 170 millimeters, and in a refinement may be from 169.5 millimeters to 169.9 millimeters. Certain geometric, dimensional and proportional attributes of piston 400, can assist in achieving goals of reduced or limited increase in engine valve temperature, limited wall-wetting and thus soot production, and increased power density, as further discussed herein.

Shelf portion 414, namely shelf surface 430, is spaced FA distance 416 from plane 458, and bottom surface 432 is spaced SA distance 422 from plane 458. A ratio of FA distance 416 to SA distance 422 may be from 7% to 11%, and in a refinement may be from 7.6% to 10.8%. FA distance 416 may be from 1.9 millimeters to 2.5 millimeters, and in a refinement may be 2.5 millimeters. A ratio of FA distance 416 to OD dimension 454 may be from 1% to 2%, and in a refinement may be from 1.1% to 1.5%. A ratio of SA distance 422 to OD dimension 454 may be from 13% to 15%, and in a refinement may be from 13.6% to 14.8%. SA distance 422 may be from 23 millimeters to 25 millimeters, and in a refinement may be 25 millimeters.

Anti-sooting ramp 442 connects to lip portion 412 at cusp 444, and cusp 444 defines a combustion bowl inner diameter (ID) dimension 456. ID dimension 456 may be from 155 millimeters to 157 millimeters, and in a refinement may be 156.5 millimeters. A ratio of FA distance 416 to ID dimension 456 may be from 1.2% to 1.6%, and a ratio of SA distance 422 to ID dimension 456 may be from 14.7% to 16.1%. Bottom surface 432 defines a bottom radius of curvature, and a ratio of the bottom radius of curvature to OD dimension 454 may be from 8% to 15%. The bottom radius of curvature may be from 15 millimeters to 25 millimeters, and in a refinement may be 22 millimeters. A ratio of the ramp radius of curvature defined by anti-sooting ramp 242 to OD dimension 454 may be from 3% to 6%.

INDUSTRIAL APPLICABILITY

Figure 5:
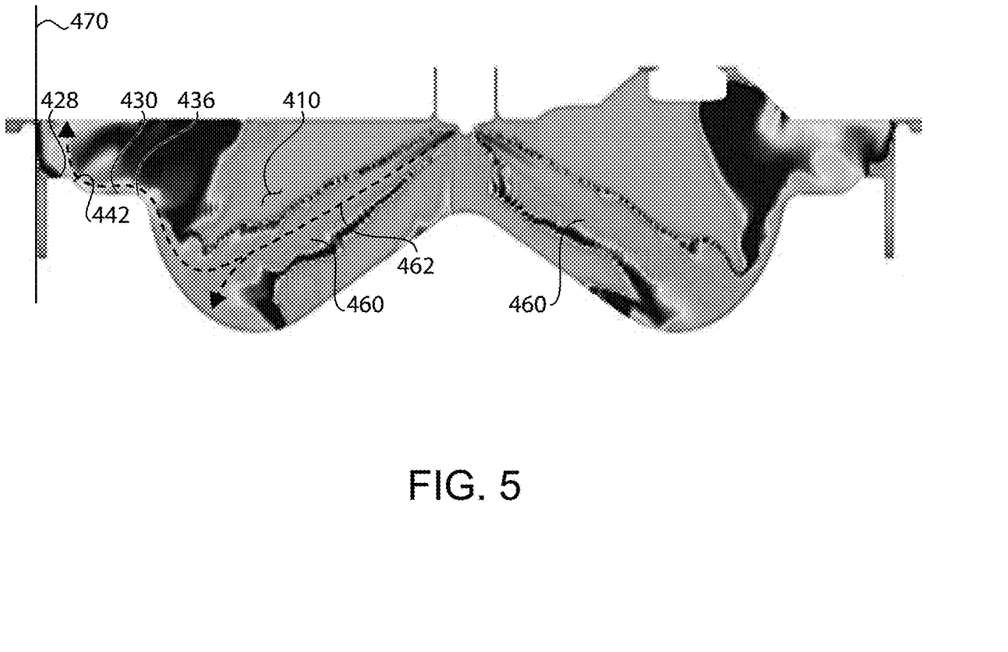
FIG. 5 is a CFD (computational fluid dynamics) graph showing fluids exiting a combustion bowl in a piston being directed away from a combustion cylinder wall, according to one embodiment.

Referring to the drawings generally, operating engine 100 can include reciprocating a piston as described herein, including example piston 400 of FIGS. 3 and 4. Fuel may be directly injected into combustion cylinder 106, such that spray plumes of the injected fuel advance outwardly and downwardly from a plurality of spray orifices through combustion bowl 418. Referring in particular to FIG. 5, there can be seen a computational fluid dynamics (CFD) depiction of fuel spray plume and fuel flow patterns during an expansion stroke in an example engine cycle, with directly injected spray plumes 460 having advanced outwardly and downwardly in combustion bowl 410 as described. It will be recalled that combustion bowl 410 may have a non-reentrant profile.

The non-reentrant profile of combustion bowl 410 can have the result of some fuel of the spray plumes being conveyed or spilling outwardly from swirl pocket 418 into a shelf volume of combustion bowl 410 formed between plane 458 and shelf surface 430. Some of the fuel, following an example fuel travel path shown by way of reference numeral 462, travels into the shelf volume, and then further travels outwardly such that the fuel exiting the shelf volume impinges upon anti-sooting ramp 442. Fuel of the spray plumes may exit the shelf volume and be redirected so as to flow upwardly from squish surface 428, based on impingement upon anti-sooting ramp 442, and thus avoid reaching and wetting a wall 470 in the combustion cylinder. In some instances, impingement of fuel upon anti-sooting ramp 242 can commence prior to a crank angle location in the engine that is 200 after a top dead center position of the piston in the expansion stroke.

Efforts to increase power density in internal combustion engines can require that relatively more fuel be combusted in a given engine cycle to enable the engine to produce more power in a given engine configuration and package size. Combusting relatively greater amounts of fuel can, however, result in combustion gases heating engine valves and/or the fire deck to temperatures that can ultimately lead to fatigue or performance degradation. According to the present disclosure, the use of a non-reentrant combustion bowl can allow some un-combusting and still-combusting fuel spray to spill out of and exit the combustion bowl in a radially outward and axially upward direction, and limit the extremes of temperature experienced by the engine valves and fire deck.

So-called "wall-wetting" is a phenomenon where fuel spray in a liquid state contacts a relative cool wall of a combustion cylinder, typically formed by a cylinder liner, with resulting incomplete combustion of the fuel producing smoke or soot. Fuel exiting a combustion bowl can thus cause or exacerbate wall-wetting phenomena if not mitigated. Also according to the present disclosure, providing an anti-sooting ramp can assist in redirecting fuel and other fluids exiting the combustion bowl shelf volume away from the combustion cylinder wall to limit wall-wetting. The present disclosure can thus be understood as providing piston geometry solutions that limit excessive temperatures of the engine valves and fire deck to enable increased power density, while mitigating an increased incidence of wall-wetting and consequent soot production that might occur as a result of those piston geometry solutions. In some instances, pistons according to the present disclosure can also accommodate a relatively late end of injection, for various purposes, or enable a relatively late end of injection to be maintained without other compensation, over what might be practicable using other pistons such as a non-reentrant piston without an anti-sooting ramp. Fuel injected near the end of an injection may be less likely to travel over the top of the piston and wet the wall using a piston as disclosed herein than a piston where no shelf surface/volume or anti-sooting ramp is employed.

The presently disclosed ratio ranges, and example dimensions and dimensional ranges, reflect a balance of design and performance considerations while still achieving the above goals. For instance, the FA distance to SA distance ratio ranges provide for a shelf volume and shelf surface location that accommodates a sufficient amount of injected fuel exiting the combustion bowl to mitigate excessive engine valve and/or fire deck temperatures, when the engine is operated at rated conditions. The FA distance to SA distance ratio is not so large, however, that combustion bowl size and shape are impacted to an extent that compression ratio, for example, or other structural attributes are changed or challenging to retain. In other words, if the FA distance is too small relative to the SA distance, then the anti-sooting functionality of the piston may be negatively impacted or negated. If the FA distance is too large relative to the SA distance, then combustion gas and/or fuel spray flow, combustion bowl size or shape, or other piston dimensional, proportional or functional attributes may be negatively impacted, or affected unpredictably. Ratios of the FA distance, SA distance, bowl bottom radius, and ramp radius to the OD dimension and/or the ID dimension, and other disclosed attributes of piston 400 such as the size of the reentrancy angle, also provide for a combustion bowl profile that is advantageously applied in a relatively large bore and large piston engine having the described OD dimension range, although the present disclosure is not strictly limited as such. Ratios given herein can be understood as the specified quantity within measurement error. Dimensions can be understood as the specified quantity within a tolerance of plus or minus 0.1 millimeter. Thus, a 5 millimeter specification is from 4.9 millimeters to 5.1 millimeters, and a 2.5 millimeter specification is from 2.4 millimeters to 2.6 millimeters.

Figure 6:
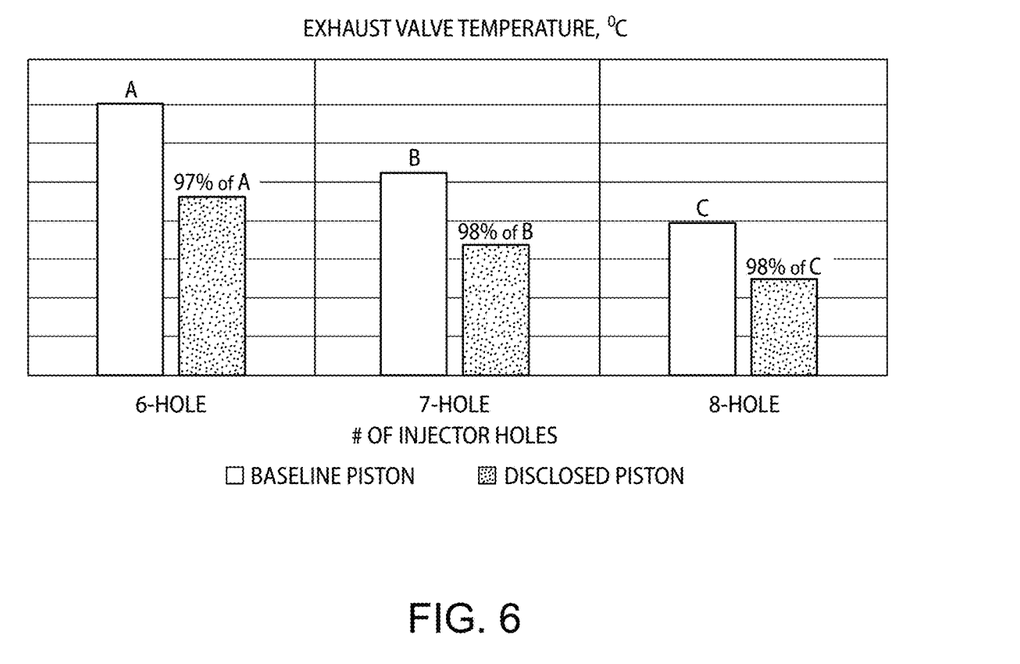
FIG. 6 is a CFD based bar graph showing an improvement of exhaust valve temperature, according to one embodiment.
Figure 7:
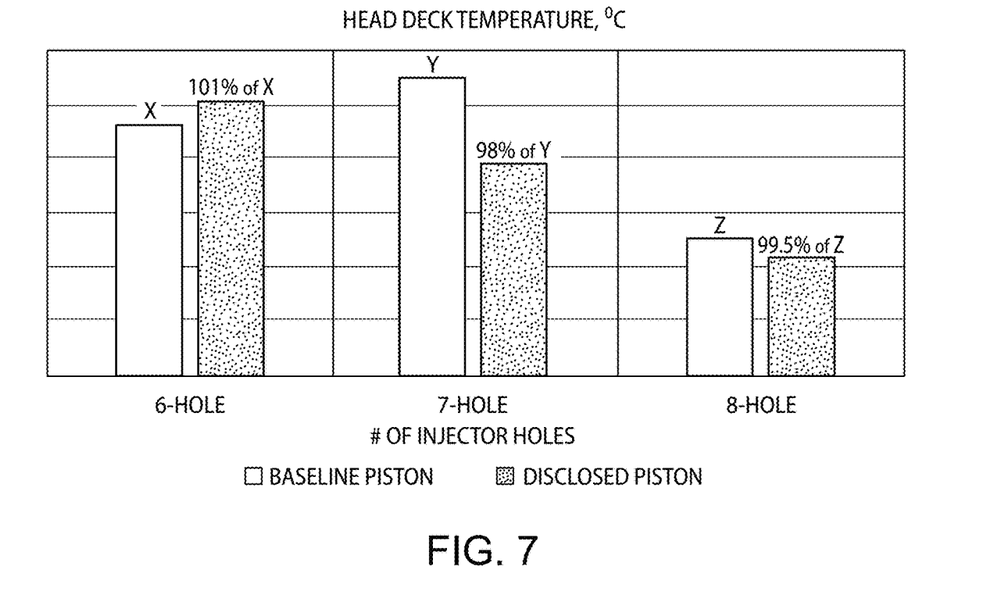
FIG. 7 is a CFD based bar graph showing an improvement of head deck temperature, according to one embodiment.
Figure 8:
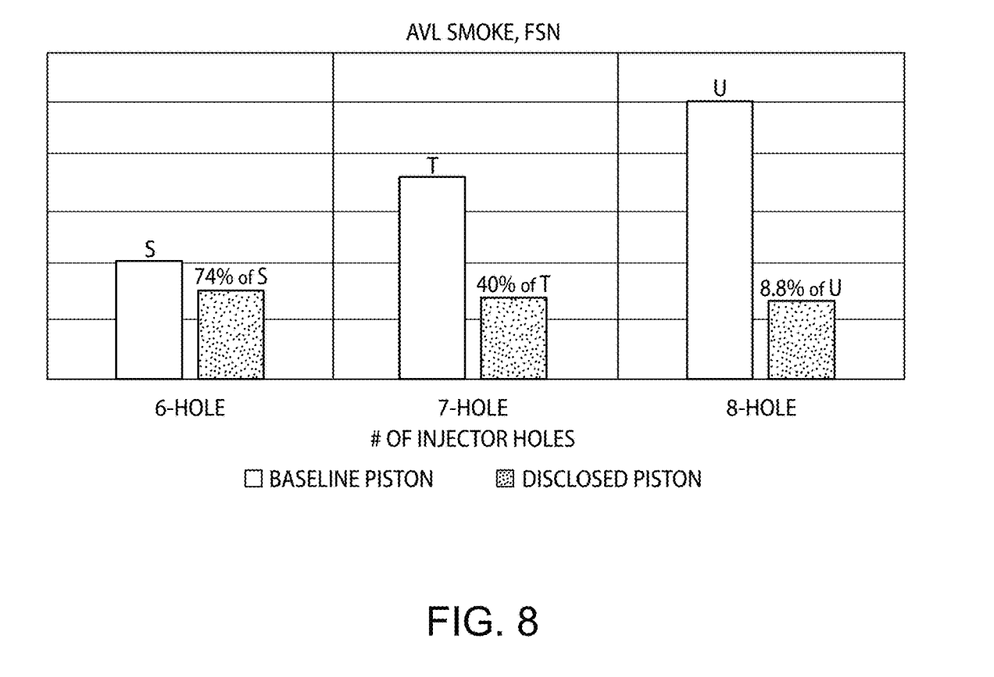
FIG. 8 is a CFD based bar graph showing an improvement of smoke or soot production, according to one embodiment.

FIG. 6 indicates that even with an increased number of holes in a fuel injector, using a piston as in the present disclosure the temperature of the exhaust valve decreases. FIG. 7 illustrates that head deck temperature unexpectedly decreases as the number of injector holes increases, using a piston as in the present disclosure. FIG. 8 indicates that soot production decreases as the number of injector holes increases using a piston as in the present disclosure. The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an internal combustion engine comprising:
    reciprocating a piston defining a piston outer diameter (OD) dimension, in a combustion cylinder in the engine;
    directly injecting a liquid fuel from a plurality of spray orifices in a fuel injector defining a longitudinal axis into the combustion cylinder in the engine;
    advancing spray plumes of the injected liquid fuel outwardly and downwardly from the plurality of spray orifices through a combustion bowl of the piston having a non-reentrant profile;
    conveying fuel of the spray plumes out of a swirl pocket of the combustion bowl into a shelf volume of the combustion bowl formed between a plane defined by a radially outer squish surface, and a radially inner shelf surface spaced an axial (FA) distance from the plane that is from 1% to 2% of the OD dimension;
    impinging fuel of the spray plumes exiting the shelf volume of the combustion bowl upon an anti-sooting ramp transitioning between the radially inner shelf surface and the radially outer squish surface; and
    directing the fuel of the spray plumes exiting the shelf volume upwardly from the squish surface based on the impingement of the fuel upon the anti-sooting ramp so as to limit wall-wetting in the combustion cylinder.

2. The method of claim 1 wherein the impinging of the fuel of the spray plumes includes commencing the impingement of the fuel prior to a crank angle location in the engine that is 20° after a top dead center position of the piston.

3. The method of claim 2 wherein the conveying of the fuel of the spray plumes out of the swirl pocket includes directing the fuel along an outer surface of the combustion bowl defining an acute angle with the plane, opening in a radially inward direction, that is from 70° to 80°.

4. The method of claim 2 wherein the advancing of the spray plumes includes advancing the spray plumes along a bottom surface of the combustion bowl defining a concave radius of curvature that is from 8% to 15% of the OD dimension.

5. The method of claim 4 wherein the bottom surface is spaced a second axial (SA) distance from the plane, and a ratio of the FA distance to the SA distance is from 7% to 11%.

6. The method of claim 5 wherein each of the radially outer squish surface and the radially inner shelf surface is planar, and the impinging of the fuel further includes impinging the fuel upon an anti-sooting ramp having a curvilinear profile that is concave to the radially outer squish surface and the radially inner shelf surface.

7. The method of claim 6 wherein the OD dimension is from 169 millimeters to 170 millimeters.

8. A piston configured to reciprocate in a combustion cylinder in an internal combustion engine comprising:
an annular body including a crown portion defining a longitudinal axis and having a radially outer lip portion defining a plane oriented normal to the longitudinal axis;
the crown portion further including a combustion bowl having a radially inner shelf portion spaced a first axial (FA) distance from the plane, and a bottom surface spaced a second axial (SA) distance from the plane;
the annular body further including an outer surface defining a piston outer diameter (OD) dimension, and a ratio of the FA distance to the OD dimension is from 1% to 2%, and a ratio of the FA distance to the SA distance is from 7% to 11%; and
the combustion bowl forms a non-reentrant profile, and the crown portion further includes an anti-sooting ramp transitioning between the radially inner shelf portion and the radially outer lip portion to redirect a flow of injected fuel exiting the combustion bowl upwardly from the radially outer lip portion, such that wall-wetting in the combustion cylinder is limited.

9. The piston of claim 8 wherein the radially inner shelf portion includes a planar shelf surface, and the radially outer lip portion includes a planar squish surface, and the anti-sooting ramp has a curvilinear profile and is concave to the planar shelf surface and the planar squish surface.

10. The piston of claim 9 wherein:
the combustion bowl includes an outer surface defining a tangent forming an acute angle with the plane, opening in a radially inward direction, that is from 70° to 80°;
the bottom surface defines a bottom radius of curvature, and a ratio of the bottom radius of curvature to the OD dimension is from 8% to 15%; and
the anti-sooting ramp defines a ramp radius of curvature, and a ratio of the ramp radius of curvature to the OD dimension is from 3% to 6%.

11. The piston of claim 10 wherein the anti-sooting ramp connects to the radially outer lip portion at a cusp defining a combustion bowl inner diameter (ID) dimension, a ratio of the FA distance to the ID dimension is from 1.2% to 1.6%, and a ratio of the SA dimension to the ID dimension is from 14.7% to 16.1%.

12. The piston of claim 8 wherein the ratio of the FA distance to the OD dimension is from 1.1% to 1.5%, a ratio of the SA distance to the OD dimension is from 13.6% to 14.8%, and a ratio of the FA dimension to the SA dimension is from 7.6% to 10.8%.

13. The piston of claim 12 wherein the OD dimension is from 169 millimeters to 170 millimeters.

14. The piston of claim 13 wherein:
the ID dimension is from 155 millimeters to 157 millimeters;
the FA distance is from 1.9 millimeters to 2.5 millimeters;
the SA distance is from 23 millimeters to 25 millimeters; and
the ramp radius of curvature is from 5 millimeters to 10 millimeters.

15. A piston for an internal combustion engine comprising:
an annular crown body defining a longitudinal axis and having a radially outer lip portion defining a plane oriented normal to the longitudinal axis;
the annular crown body further including a combustion bowl having a radially inner shelf portion spaced a first axial (FA) distance from the plane, a bottom surface spaced a second axial (SA) distance from the plane, and an outer surface defining a tangent forming an acute angle with the plane opening in a radially inward direction;
the a piston skirt attached to the annular crown body defining a piston outer diameter (OD) dimension that is from 169 millimeters to 170 millimeters, and the FA distance is from 1.9 millimeters to 2.5 millimeters; and
the radially outer lip portion includes a planar squish surface and the radially inner shelf portion includes a planar shelf surface, and an anti-sooting ramp transitions between the planar shelf surface and the planar squish surface and has a concave curvilinear profile.

16. The piston of claim 15 wherein the OD dimension is from 169.5 millimeters to 169.9 millimeters.

17. The piston of claim 16 wherein the anti-sooting ramp connects to the radially outer lip portion at a cusp defining a combustion bowl inner diameter (ID) dimension that is from 155.5 millimeters to 156.5 millimeters.

18. The piston of claim 16 wherein:
the SA distance is from 23 millimeters to 25 millimeters;
the anti-sooting ramp defines a ramp radius of curvature from 5 millimeters to 10 millimeters; and
the bottom surface defines a radius of curvature from 15 millimeters to 25 millimeters.

19. The piston of claim 18 wherein the FA dimension is 2.5 millimeters and the SA dimension is 25 millimeters.

* * * * *